UNITED STATES PATENT OFFICE.

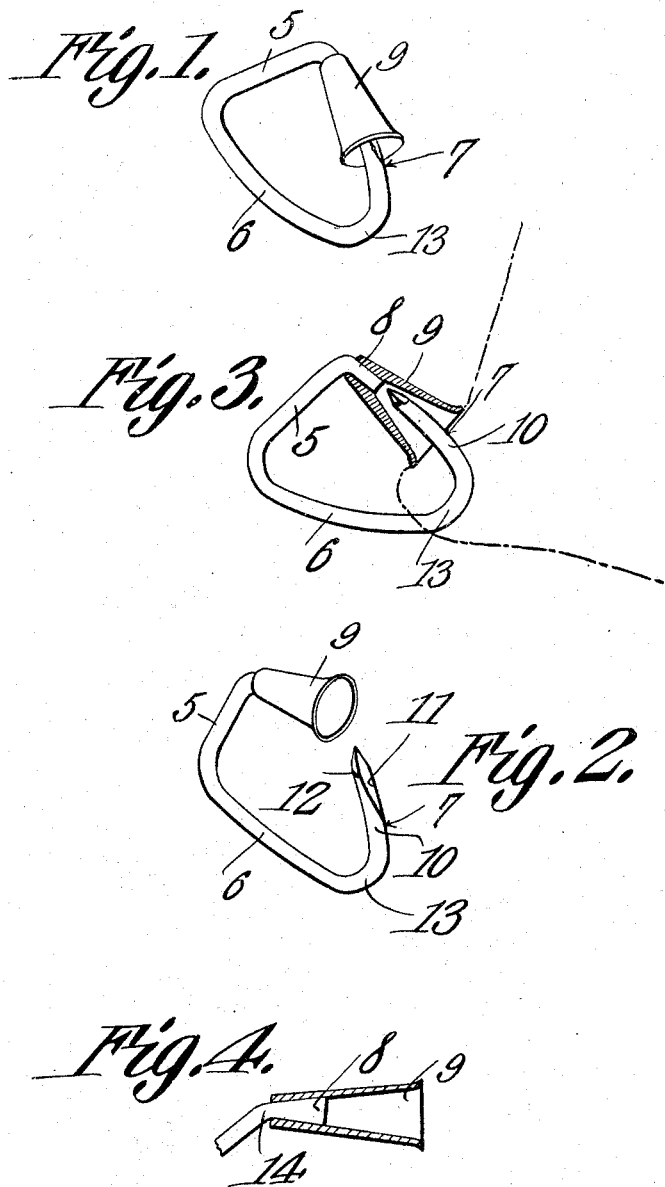

ROBERT ROETHLISBERGER, OF COLUMBUS GROVE, OHIO.

HOG-RING.

No. 928,155.  Specification of Letters Patent.  Patented July 13, 1909.

Application filed March 31, 1909. Serial No. 486,948.

*To all whom it may concern:*

Be it known that I, ROBERT ROETHLISBERGER, a citizen of the United States, residing at Columbus Grove, in the county of Putnam and State of Ohio, have invented a new and useful Hog-Ring, of which the following is a specification.

It is the object of the present invention to provide an improved construction of hog ring which will effectually prevent rooting on the part of the hog to which it is applied.

A further object of the invention is to provide a hog ring of such general shape and construction that when applied it will stand out from in front of the snout of the hog and upwardly to a slight degree so that as soon as the animal attempts to root in the ground, the ring will be turned or twisted backwardly and downwardly thereby causing such pain as to cause the animal to desist from his effort.

It is a further object of the invention to so construct the hog ring as to positively prevent its being turned to such position as to not cause pain upon an attempt upon the part of the animal to root in the ground or rather to so construct it that when applied it will be uncomfortable in any but one position and this of course being the one which will prove most effective when an attempt is made at rooting.

In the accompanying drawings, Figure 1 is a perspective view of a hog ring constructed in accordance with the present invention, the ring being shown closed. Fig. 2 is a similar view but showing the ring open. Fig. 3 is a view in side elevation and partly in section of the rings as applied to an animal, the animal's snout being indicated in dotted lines, and Fig. 4 is a detail view similar to Fig. 3 but only of the socket end of the ring and showing a modification in the structure thereof.

As shown in the drawings, the device is of the open integral ring type and is formed, in part, from a length of stout wire bent substantially into the form of a triangle, one side of which is indicated by the numeral 5, another side by the numeral 6, and the third side in general by the numeral 7, this latter side being comprised of the terminal portions of the ring or length of wire comprising the same as is clearly shown in Fig. 3 of the drawings. The side 5 of the triangular ring is preferably of less length than the sides 6 and 7, and the said sides 6 and 7 are preferably of substantially the same length when the ring is closed, and one terminal portion of the side 7, indicated by the numeral 8, is received in the minor end of a frusto-conical socket 9, the socket being either soldered upon this end or terminal portion of the side 7, or otherwise secured as will be presently explained. As shown in the said Fig. 3 of the drawings, the socket 9 projects considerably beyond the end of the terminal portion 8 of the ring and its major end is of considerably greater diameter than is its minor end and, as illustrated in Fig. 1 is adapted to receive the other terminal portion of the ring which portion is indicated by the numeral 10. This last mentioned portion 10 of the ring is sharpened to a point by beveling its outer side as indicated by the numeral 11, and also beveling its inner side at its point as at 12, and in applying the ring to the snout of an animal, the terminal portion 10 is inserted point first through the animal's snout and the ring is then closed with any suitable implement such as a pair of pliers, so that its said terminal portion 10 will project into the socket 9, preferably axially thereof as shown in Fig. 3. When applied, as observed from Fig. 3 of the drawings, the terminal portion 10 and the bend formed in the wire comprising the hook, indicated by the numeral 13 resulting in the said terminal portion 10, are received or passed through the animal's snout and the major end of the frusto-conical socket 9, when in normal position, bears against the upper surface of the snout, the side 6 of the ring extending forwardly at a slight upward inclination and the side 5 extending upwardly and backwardly at an acute angle with respect to the side 5. It will thus be seen that should the animal attempt to root in the ground the ring will be swung or twisted backward and downwardly bringing the side 6 sharply against the animal's lower lip and at the same time pulling forwardly on the upper lip. The pain caused by this movement of the ring will result in the animal restoring the ring to normal position by a downward movement of the snout against the ground in which position the ring will cause no inconvenience. Also, any direct forward movement of the snout against a fence in an attempt to pass therethrough will result in the sharp edge of the socket 9 at the major end thereof bearing firmly against the upper side of the animal's snout and the pain caused by this contact of the end of the socket will naturally cause the animal to desist from such effort.

It may be found preferable, in manufacturing the ring embodying the invention, to form the terminal portion 8 of the ring to fit the interior of the socket 9 at the minor end thereof and inasmuch as the minor end of the socket will then bear against the bend formed between this terminal portion and the side 5 of the ring, which bend is indicated by the numeral 14, the socket will, in effect be riveted upon the said end of the ring and will be held securely in place.

What is claimed is:—

1. A device of the class described comprising an open ring having a conical socket at one terminal, the major end of the socket being presented toward the other terminal of the ring and the said other terminal of the ring being adapted to be inserted into the socket, with the edge of the socket at the major end thereof in spaced relation to the said terminal and sharpened to a cutting edge.

2. A device of the class described comprising an open ring substantially triangular in form, the terminals of the ring constituting one side of the triangle, the ring being provided at one terminal with a flared socket and adapted to have its other terminal inserted into the socket, the said socket being of a diameter greater than the diameter of the said other terminal of the ring.

3. A device of the class described comprising an open ring substantially triangular and having its terminals constituting one side of the said triangle, and provided one with a socket and the other with a sharp point adapted for insertion into the socket, the said socket being of a diameter greater than the diameter of the said other terminal of the ring.

In testimony that I claim the foregoing as my own, I have hereto affixed my signature in the presence of two witnesses.

ROBERT ROETHLISBERGER.

Witnesses:
A. M. ALLEN,
C. H. LOGAN.